United States Patent
Tobin et al.

(10) Patent No.: US 9,087,040 B2
(45) Date of Patent: Jul. 21, 2015

(54) METHOD AND APPARATUS FOR PERFORMING HOST BASED DIAGNOSTICS USING A SERVICE PROCESSOR

(71) Applicant: Oracle International Corporation, Redwood City, CA (US)

(72) Inventors: Garry Michael Tobin, Atkinson, NH (US); Robert Fournier, Groton, MA (US); David A. Colantuoni, Bow, NH (US)

(73) Assignee: Oracle International Corporation, Redwood Shores, CA (US)

( * ) Notice: Subject to any disclaimer, the term of this patent is extended or adjusted under 35 U.S.C. 154(b) by 253 days.

(21) Appl. No.: 13/721,749

(22) Filed: Dec. 20, 2012

(65) Prior Publication Data

US 2014/0181586 A1    Jun. 26, 2014

(51) Int. Cl.
| | | |
|---|---|---|
| *G06F 11/27* | (2006.01) | |
| *G06F 17/30* | (2006.01) | |
| *G06F 9/44* | (2006.01) | |
| *G06F 9/50* | (2006.01) | |
| *G06F 9/455* | (2006.01) | |

(52) U.S. Cl.
CPC .............. *G06F 11/27* (2013.01); *G06F 9/4411* (2013.01); *G06F 9/5077* (2013.01); *G06F 17/30233* (2013.01); *G06F 2009/45579* (2013.01)

(58) Field of Classification Search
CPC . G06F 11/22; G06F 11/2236; G06F 11/2294; G06F 11/2736; G06F 11/27; G06F 11/2284; G06F 9/5077; G06F 9/4411; G06F 2011/2278; G06F 2212/152; G06F 2009/45579; G06F 17/30233; G06F 17/30235; G06F 17/30238; G06F 17/3023
USPC ............................................................ 714/31
See application file for complete search history.

(56) References Cited

U.S. PATENT DOCUMENTS

| | | | | |
|---|---|---|---|---|
| 6,865,691 | B1 * | 3/2005 | Brundridge et al. | 714/25 |
| 7,225,327 | B1 * | 5/2007 | Rasmussen et al. | 713/2 |
| 8,099,630 | B2 * | 1/2012 | Lim | 714/36 |
| 8,639,985 | B2 * | 1/2014 | Zhang | 714/43 |
| 8,667,246 | B2 * | 3/2014 | Rope et al. | 711/168 |

* cited by examiner

*Primary Examiner* — Bryce Bonzo
*Assistant Examiner* — Anthony J Amoroso
(74) *Attorney, Agent, or Firm* — Osha Liang LLP

(57) ABSTRACT

A method for performing a set of diagnostics on a host system using a service processor. The method includes recognizing a power-on event, and in response checking a diagnostic flag, where the diagnostic flag indicates the set of diagnostics to be performed. Retrieving, from internal storage of the service processor, a disk image including the set of diagnostics to be performed. Mounting, using a disk image reader, the disk image to obtain a mounted disk image. Making the mounted disk image accessible as a device using a virtual device driver. Mounting, using a connection between the service processor and the host system, the device within the host system, and performing the set of diagnostics on the host system.

18 Claims, 4 Drawing Sheets

METHOD AND APPARATUS FOR PERFORMING HOST BASED DIAGNOSTICS USING A SERVICE PROCESSOR

BACKGROUND

A diagnostic is an software test, simulation or inspection that is performed on a computer system in order to evaluate the computer system's performance according to useful metrics such as utilization, speed, health and efficiency. In order to perform diagnostics, computer systems must either boot the diagnostics directly from removable storage media such as optical disks or run the diagnostics as software within the operating system of the computer.

SUMMARY

In general, in one aspect the invention relates to a method for performing a set of diagnostics on a host system using a service processor, including, recognizing a power-on event; in response to the power-on event, checking a diagnostic flag, where the diagnostic flag indicates the set of diagnostics to be performed, retrieving, from internal storage of the service processor, a disk image comprising the set of diagnostics to be performed, mounting, using a disk image reader, the disk image to obtain a mounted disk image, making the mounted disk image accessible as a device using a virtual device driver, mounting, using a connection between the service processor and the host system, the device within the host system, and performing, after the mounting of the device, the set of diagnostics on the host system.

In general, in one aspect the invention relates to an integrated diagnostic system, including a host system, including a processor and a southbridge connected to the processor, wherein the southbridge is include functionality to communicate with peripheral devices, a service processor, including functionality to communicate with the host system using the south bridge, and including an internal storage, a virtual device driver and a loop driver, the internal storage, configured to store a disk image, diagnostics flags, and diagnostic scripts, where the disk image comprises a set of diagnostics to be run on the host system, and where the diagnostic flags and diagnostics scripts include information for executing a set of diagnostics on the host system a disk image reader, including functionality to mount the disk image within the service processor to obtain a mounted disk image, a loop driver including functionality to make the disk image accessible to the service processor as a file system, a virtual device driver, including functionality to make the disk image appear to the host system as a device, and a user interface, including functionality to allow a user to interact with the system.

In general, in one aspect, the invention relates to a non-transitory computer readable medium including instructions for performing a set of diagnostics, the instructions including, recognize a power-on event, check a diagnostic flag, where the diagnostic flag indicates the set of diagnostics to be performed retrieve, from internal storage of a service processor, a disk image including the set of diagnostics to be performed mount, using a disk image reader, the disk image to obtain a mounted disk image, make the mounted disk image accessible as a device using a virtual device driver, mount, using a connection between the service processor and the host system, the device within the host system, and perform, after the mounting of the device, the set of diagnostics on the host system.

Other aspects of the invention will be apparent from the following description and the appended claims.

DETAILED DESCRIPTION

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-5, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

In general, embodiments of the invention relate to an integrated diagnostic system and an a method for performing a set of diagnostics on a host system. More specifically, embodiments of the invention relate to retrieving a disk image that includes the set of diagnostics from internal storage of a service processor connected to the host system, and presenting the disk image to the host system as a bootable device. The host system then boots from the disk image, running the diagnostics and writing the results back onto the disk image. A loop driver in the service processor accesses the disk image while the diagnostics are being run, and a user interface connected to the service processor allows the user to receive the diagnostics results in real-time and interact with the disk image to affect the performance of the diagnostics.

Figure 1:
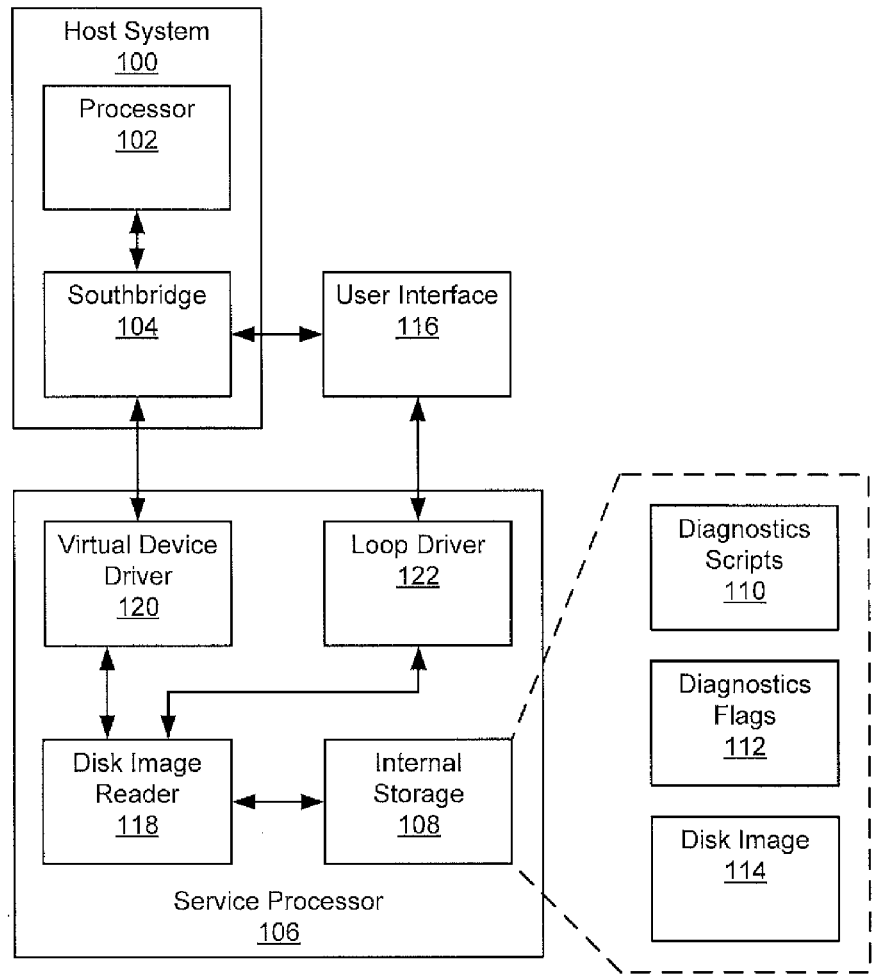
FIG. 1 shows a schematic diagram of a system in accordance with one embodiment of the invention.

FIG. 1 shows the integrated diagnostic system in accordance with one embodiment of the invention. The integrated diagnostic system includes a host system (100), including a processor (102), and a south bridge (104) connected to the processor (102), a service processor (106) and a user interface (116).

In one embodiment of the invention, the host system (100) is any of a wide variety of computer systems. In one embodiment of the invention, the firmware of the host system (100) is configured according the universal extensible firmware interface (UEFI). The host system (100) may be either a personal computer or an enterprise machine, and may be a laptop, a desktop, a tablet, or any other form of personal electronic device.

The host system (100) may include one or more processor(s) (102), associated memory, a storage device (e.g., a hard disk, an optical drive such as a compact disk drive or digital video disk (DVD) drive, a flash memory stick, etc.), and numerous other elements and functionalities typical of today's computers (not shown). The host system (100) may also include input means, such as a keyboard, a mouse, or a microphone (not shown). Further, the host system (100) may include output means, such as a monitor (e.g., a liquid crystal display (LCD), a plasma display, or cathode ray tube (CRT) monitor). The host system may be connected to a network (e.g., a local area network (LAN), a wide area network (WAN) such as the Internet, or any other type of network) via a network interface connection (not shown). Those skilled in the art will appreciate that many different types of computer systems exist, and the aforementioned input and output means may take other forms. Generally speaking, the host system (100) includes at least the minimal processing, input, and/or output means necessary to practice embodiments of the invention.

Further, those skilled in the art will appreciate that one or more elements of the aforementioned host system (100) may be located at a remote location and connected to the other elements over a network. In one embodiment of the invention, the host system (100) is one or more servers located within the same rack or cluster. In one embodiment of the invention, the host system (100) is a distributed database management system, and the diagnostics may be run on the management systems or the databases themselves. In this case, every separate system within the host system (100) may be accessible to a single service processor (106). The diagnostics being performed may be executed sequentially or simultaneously on one or more of the separate systems within the host system (100). One diagnostic may be run that spans multiple systems within the host system (100). The host system (100) may not be local to the access point from which the performance of the diagnostics are being controlled. The host system (100) may include functionality to be controlled by the service processor (106) while powered-off or in an unbooted state.

In one embodiment of the invention, the southbridge (104) is an integrated chip located on the host system (100) and configured to act as a hub for the host system (100) and includes functionality to send and receive input and output from various peripheral devices. The input/output functionality may include functionality to support universal serial bus (USB), audio, serial, a basic input/output system (BIOS) of the host system (100), an interrupt controller, integrated drive electronics (IDE) channels, or any of a variety of other busses and communication channels. The southbridge (104) may be configured to communicate with the processor (102) via a connection to a northbridge (not shown), an integrated chip also located on the host system (100), that is connected directly to the processor (102). Alternately, the northbridge may be located on the processor die, integrated with the processor, or omitted entirely, and the southbridge (104) may be connected directly to the processor (102). In one embodiment of the invention, the southbridge (104) itself may be located on the processor die or integrated directly with the processor (102).

In one embodiment of the invention, the integrated diagnostic system includes a service processor (106) operatively connected with the host system (100). In one embodiment of the invention, the service processor (106) is an Integrated Lights-Out Manager™ (ILOM), that is, a hardware system sharing the circuit board of the host system (100) hardware, but able to function independently of the host system (100). The service processor (106) includes functionality to monitor and manage the host system (100) while the host system (100) is shut down or otherwise powered off. This may be achieved by the host system (100) having a dedicated channel with which to interact with the service processor (106). Alternately, the service processor (106) may connect to the host system (100) as a standard peripheral device. The service processor (106) may be configured to access the host system (100) via communication with the southbridge (104) connected to the processor (102) of the host system (100). In one embodiment of the invention, the service processor (106) includes internal storage (108), a disk image reader (118), a virtual device driver (120), and a loop driver (122). The service processor (106) may be accessed and controlled by various means, including remotely via a network connection or directly using standard I/O hardware, i.e. a mouse, keyboard and display. In one embodiment of the invention, some or all of these components are specific to the integrated diagnostic system, and are separate from the software and hardware of the service processor (106), although they are controlled by the service processor (106).

In one embodiment of the invention, the internal storage (106) may include one or more hard drives, solid state drives, flash drives or other forms of non-volatile memory. The internal storage (106) may writeable, or may be read-only. There internal storage (106) may have any of a variety of possible capacities and file system schema. In addition to the software/firmware and other data relevant to the standard operation of the service processor (106), the internal storage (106) may also store information or software for the integrated diagnostic system in one or more data structures. The data structures may include diagnostic scripts (110), one or more diagnostic flags (112) and a disk image (114) storing the set of diagnostics. In one embodiment of the invention, the data items, structures, and code relevant to the integrated diagnostic system are stored on a separate storage device from that of the service processor (106), but which is accessible to the service processor (106).

In one embodiment of the invention, the diagnostics scripts (110) are software including instructions for executing a set of diagnostics. A script is a set of tasks to be executed by a processor. The set of tasks included in the diagnostic script (110) may specify, for example, the selection of the diagnostics to be performed, the order in which they are performed, what results are to be retrieved from the execution of the diagnostics, on what components of the host system (100) the diagnostics are to be run, as well as other aspects of the management and execution of the diagnostics.

In one embodiment of the invention, the diagnostic flag (112) may be accessed and set by accessing the service processor (108) with the user interface (116). Alternately, the diagnostic flag (112) may be set automatically by some process within the host system (100), or dictated by some internal schedule of the integrated diagnostic system. In one embodiment of the invention, the diagnostic flag (112) is set while the host system (100) is powered down, and is checked every time the host system (100) powers on, before the operating system boots. If the diagnostic flag (112) is set, the service processor (106) mounts the disk image (114) in the host system (100), which boots from the disk image (114) to perform the diagnostics. If the diagnostic flag (112) is not set, the host system (100) boots normally. In one embodiment of the invention, additional diagnostic flags (112) may be used to set additional conditions for the execution of the diagnostics. The additional conditions may include, for example, whether the diagnostics will be performed manually or automatically, what diagnostics are to be performed, on what components of the host system (100) the diagnostics are to be performed, how the results of the diagnostics are to be dealt with, and other variables related to performing the diagnostics. In one embodiment of the invention, the diagnostic flag is stored in a designated location of the host system (100), with its condition dictated through the host system (100) rather than the service processor (106).

In one embodiment of the invention, the diagnostics performed by the integrated diagnostic system are stored on a disk image (114) located in the internal storage (108). In one embodiment of the invention, the disk image (114) is one or more file(s) including one or more character arrays arranged so as to mimic data stored on an optical (i.e. a CD-ROM, DVD-ROM, Blu-Ray, etc) or hard drive disk. The disk image (114) may appear within a file system as a dataset, which can only be interpreted by specialized software. The disk image (114) may be made by copying a physical disk, or it may be created directly from raw data. In one embodiment of the invention, the various diagnostics that may be executed are stored separately, and before the disk image (114) is mounted as a device, the diagnostics are assembled into the correct format and order to be performed. Alternately, or additionally, there may be multiple disk images (114) and the appropriate one is selected when the diagnostics are to be run. It may also be possible for multiple disk images (114) to be selected, mounted and executed simultaneously.

In one embodiment of the invention, the diagnostic system and host system (100) are controlled by a user interface (116). In one embodiment of the invention, the user interface (116) may be connected to the service processor (106) via a network connection. The user interface (116) may alternately be a display and input device connected directly to the service processor (106). In one embodiment of the invention, a specific device or computer may be connected to the service processor (106) in order to access it. The user interface (116) may be a command line interface displayed in a command terminal, either the actual terminal of the service processor (106) or a pseudo-terminal located on a separate system. Alternately, the user interface (116) may be presented as a webpage and displayed within a web browser on the separate system. In one embodiment of the invention, the host system (100) and the service processor (106) are controlled by separate user interfaces (116), or are separately connected to the same user interface (116).

In one embodiment of the invention, the disk image (114) is mounted in the service processor software with a disk image reader (118). The disk image reader (118) is a software application which includes functionality to present the disk image (114) as if it were a physical disk being recognized by the system to other software applications running on the service processor (106). In one embodiment of the invention, the disk image reader (118) includes functionality to present the mounted disk image (118) to multiple applications within the service processor (106) simultaneously. Additionally, the disk image reader (118) may provide functionality for the applications to modify the disk image (118), and for the modifications to the disk image (118) to be reflected to other applications accessing the mounted disk image (114). The disk image reader (106) may further provide functionality to create new disk images (114). This may be done by copying a mounted physical disk that the disk image reader (106) has access to, aggregating the content of other disk images (114), or creating them from scratch.

In one embodiment of the invention, the integrated diagnostic system includes a virtual device driver (120) with the functionality to present a disk image (118) as a device to the host system (100). In one embodiment of the invention, the virtual device driver (120) consists of a client with functionality to read the mounted disk image (114), and communicate with a server in the portion of the virtual device driver (120) that is connected to the host system (100). In one embodiment of the invention, the virtual device driver (120) may mount the disk image (114) as a bootable disk within the host system. Alternately, the disk image (114) may be presented to the host system (100) by the virtual device driver (120) being mounted as a bootable drive, and accessing the disk image (114), and sending contents and instructions therein to the host system (100) as needed. The host system (100) may be required to conform to the UEFI standard in order to boot from a certain types of devices.

In one embodiment of the invention, the loop driver (122) is a software program including functionality to read the disk image (114) and display the contents in a file system accessible format. The loop driver (122) may make the mounted disk image (114) accessible to a filesystem as a mounted physical disk. The loop driver (122) may present the mounted disk image (114) as a mounted drive or as part of the service processor (106) file system. The diagnostics and any diagnostic meta-data or results on the disk image (114) may be presented as a single file, or as multiple files within the disk image (114). In one embodiment of the invention, the loop driver (122) allows a user or program running on the service processor (106) to modify the contents of disk image (114). The modification may include the addition or removal of diagnostics to the disk image (114) or the reordering and activation/deactivation of diagnostics already on the disk image (114). In one embodiment of the invention, as the diagnostics are being performed on the host system (100) the results are written back onto the disk image (114). The loop driver (122) allows the results of the diagnostics to be viewed and interacted with in real time.

Figure 2:
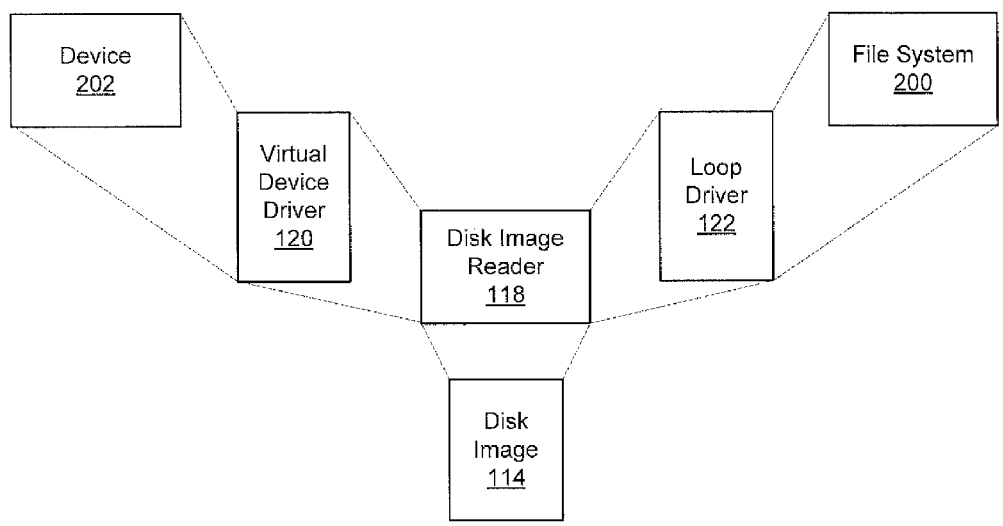
FIG. 2 shows dual mounting a disk image in accordance with one embodiment of the invention.

FIG. 2 shows dual mounts of the disk image in accordance with one or more embodiments of the invention. As discussed above, the disk image (114) may be simultaneously mounted as both a file system (200) and a device (202). More specifically, the disk image (114) may simultaneously appear to the host system as a device (202) and to the service processor as a file system (200).

Figure 3:
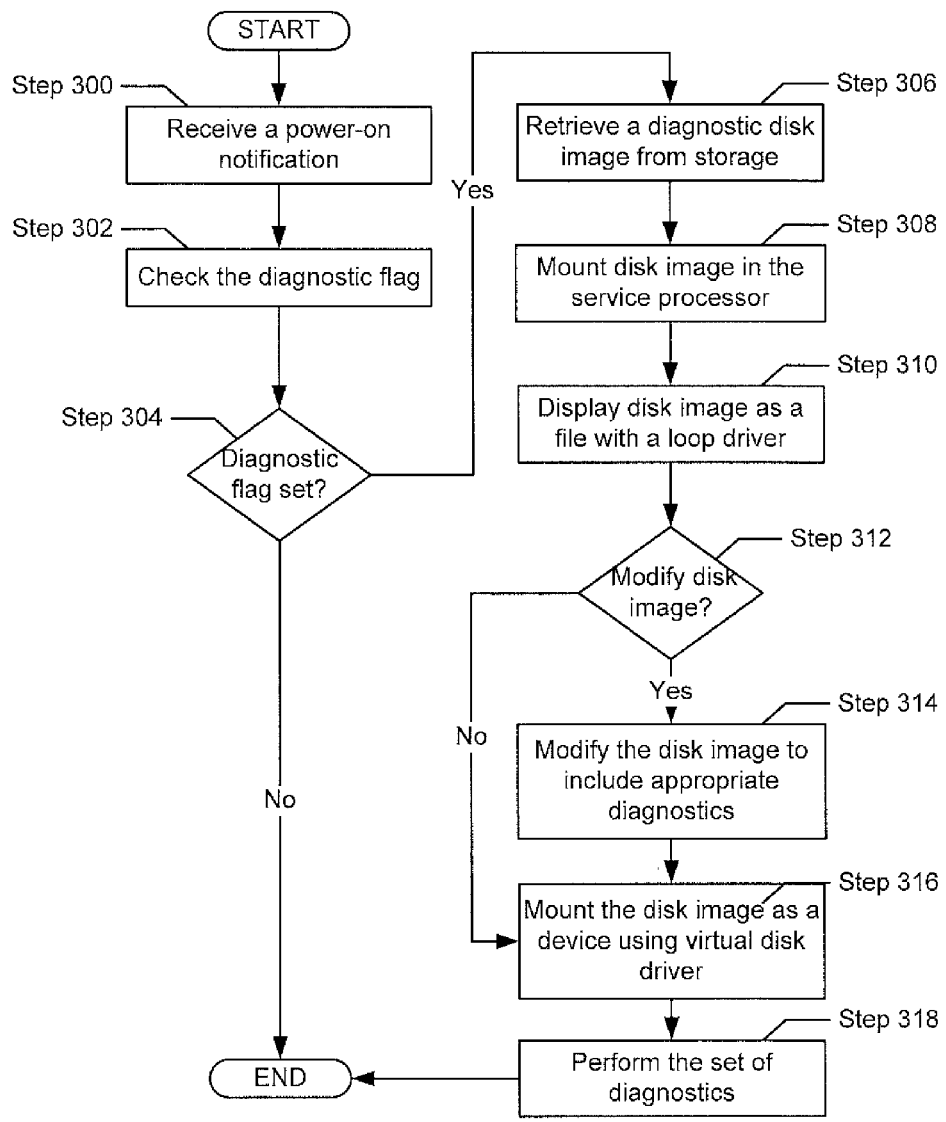
FIG. 3 shows a flowchart for preparing to perform a set of diagnostics in accordance with one embodiment of the invention.
Figure 4:
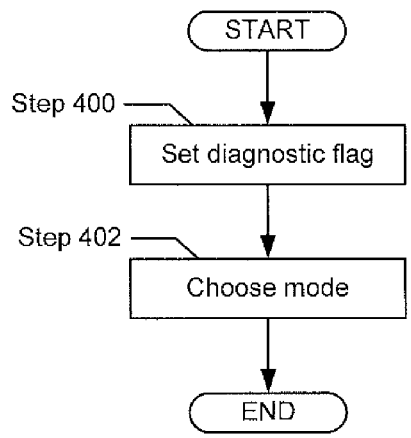
FIG. 4 shows a flowchart for initializing a method for performing a set of diagnostics in accordance with one embodiment of the invention.
Figure 5:
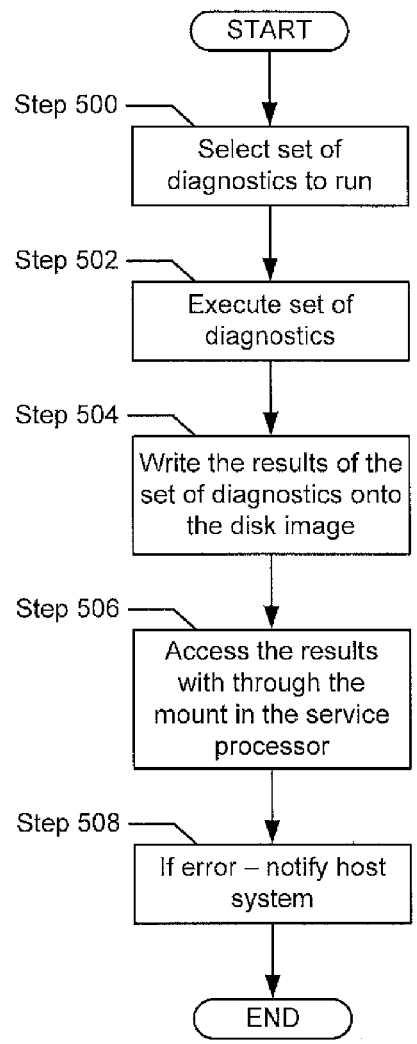
FIG. 5 shows a flowchart for performing a set of diagnostics in accordance with one embodiment of the invention.

FIGS. 3-5 show flowcharts in accordance with one embodiment of the invention. While the various steps in the flowcharts are presented and described sequentially, one of ordinary skill will appreciate that some or all of the steps may be executed in different orders, may be combined or omitted, and some or all of the steps may be executed in parallel.

FIG. 3 shows a flowchart for preparing to perform a set of diagnostics in accordance with one embodiment of the invention.

In Step 300, the diagnostic system receives a power-on notification. The power-on notification may indicate that the host system has been activated. In one embodiment of the invention, the diagnostic system may be configured to affect the power state of the host system as needed to run diagnostics (i.e. restart the computer when it is instructed to perform diagnostics, or in between different diagnostics).

In Step 302, the diagnostic flag is checked to determine if any diagnostics are to be performed. In one embodiment of the invention, there is a single diagnostic flag that signifies only if diagnostics are to be performed or not. Alternately, the diagnostic flags may signify a variety of additional variables. In the case that there are multiple diagnostic flags, they may be checked at various points throughout the diagnostic process.

In Step 304, a determination is made as to whether the diagnostic flag is set. If the flag is not set, then no diagnostics are to be run, and the host system boots as normal. If the flag is set, the service processor takes over the boot process in order to run the diagnostic (See Step 300).

In Step 306, a disk image with the appropriate set of diagnostics is retrieved from the internal storage of the service processor. In one embodiment of the invention, there is only a single diagnostic disk which is automatically retrieved. Alternately, there are multiple disk images with different diagnostics, and additional flags or instructions may be checked in order to determine the appropriate disk image. In one embodiment of the invention, the diagnostics are not stored as complete disk images, and the appropriate diagnostics must be selected and compiled into a disk image.

In Step 308, the disk image is mounted by a disk image reader within the service processor. In one embodiment of the invention, mounting the disk image includes reading the disk image and presenting the data stored on it as though a physical disk drive is being read by the service processor. Mounting the disk image provides an interface for the disk image within the service processor, by which other processes can interact with it. In one embodiment of the invention, the mounted disk image is a copy of the original disk image. In either case, access to the mounted disk may be read-only, or have only be write enabled for processes with appropriate permissions. The access permissions for the mounted disk may be controlled by the service processor, and/or obtained from an external source. In one embodiment of the invention, multiple disk images may be mounted simultaneously. The same disk image may also be independently mounted multiple times.

In Step 310, the disk image is mounted by a loop driver as a device file system within the service processor. The mounting makes the disk image accessible within the service processor as a block device. A block device is an implementation of a device file system used make the contents of a device accessible within the file system of the computer to which the device is connected. The loop driver may require the disk image to be mounted by the disk image reader before mounting it as a file system. Alternately, the loop driver may mount the disk image separately from the disk image reader. In one embodiment of the invention the loop driver is the only mount for the disk image, and includes the functionality of the disk image reader.

In Step 312, a determination is made as to whether the disk image needs to be modified. The determination may be made based upon the state of a diagnostic flag, based upon some instruction received from the user or script controlling the execution of the diagnostic, or because the disk image itself includes instructions that modification is needed. If no modification is required, Step 314 is omitted.

In Step 314, the disk image is modified so that it includes an appropriate set of diagnostics. The modifications may include the activation/deactivation of diagnostics already on the disk image, the addition or removal of diagnostics that are not present on the disk image, the reordering of the diagnostics, and the addition of instructions, programs and scripts by which the execution of the diagnostics is managed.

In Step 316, the disk image is mounted as a device within the host system. In order to mount the disk image as a device, the disk image may first need to be mounted by one or both of the disk image reader or loop driver. In one embodiment of the invention, the device is mounted using the management channel by which the service processor has access to the host system. In one embodiment of the invention, the service processor may connect to the southbridge of the host system via USB protocol, in which case the disk image is mounted to the host system as a bootable USB device. In one embodiment of the invention, the connection to between the host system and the service processor is a server-client pair, with the client in the service processor In Step 318, the integrated diagnostic system performs the set of diagnostics on the host system. The execution of the diagnostics is described in greater detail in the description of FIG. 5.

FIG. 4 shows a flowchart for initializing a method for performing a set of diagnostics in accordance with one embodiment of the invention.

In Step 400, the diagnostic flag is set. In one embodiment of the invention, the diagnostic flag is located within the internal storage of the service processor, and is accessed through the user interface. The diagnostic flag indicates that the diagnostic is to be performed the next time that the service processor detects a power-event. The diagnostic flag may be set while the host system is powered off. In one embodiment of the invention, the boot priority of the host system may be altered when the diagnostic flag is set, so that the host system boots from the appropriate mounted device. In one embodiment of the invention, the service processor includes functionality to control this aspect of the host system. In one embodiment of the invention, there are multiple diagnostics flags, which may control different conditions and variables of the execution of the diagnostics. All of the diagnostics flags may need to be actively set, or they may include default values for performing diagnostics.

In Step 402, the mode in which the diagnostics are to be run is selected. Possible modes may include user-run, service-processor run and host system run. In one embodiment of the invention, the mode is selected by choosing and setting one or more diagnostic flags. The mode may also be an inherent characteristic of the set of diagnostics being performed. In one embodiment of the invention, the mode is selected during the preparation of the diagnostic disk image. In one embodiment of the invention, the mode may be changed at any point during the execution of the diagnostics.

FIG. 5 shows a flowchart for performing a set of diagnostics with an integrated diagnostic system in accordance with one embodiment of the invention.

In Step 500, a set of diagnostics to run is selected. The set of diagnostics may be selected before the integrated diagnostic system is run or while the integrated diagnostic system is being prepared. In one embodiment of the invention, the integrated diagnostic system is run manually, and the diagnostics being performed are selected dynamically. The selection of the diagnostics may be made by setting flags before the diagnostic system is booted. Alternately, the selection may be made by specifying or uploading diagnostic scripts that include instructions on which diagnostics are to be run. In one embodiment of the invention, the selection is made by modifying the contents of the disk image from which the diagnostics are to be run before it is mounted in the host system.

In Step 502, the set of diagnostics is executed on the host system. In one embodiment of the invention, the service processor is connected to the southbridge of the host system via USB. The service processor leverages the USB connection to present the disk image as a mounted USB device. The host system boots from the USB device as it normally would from a mounted drive. The diagnostics included on the disk image are then executed by the host system. In one embodiment of the invention, the execution of the diagnostics is controlled by the service processor, rather than the host system.

In Step 504, the results of executing the set of diagnostics on the host system are written back onto the disk image. In one embodiment of the invention, the results may include notifications of success and failure of the diagnostics, i.e. whether a diagnostic was passed or failed, and what the cause of the failure was. A cause of failure, for example, would be the diagnostic taking to long to run, and timing out. Other examples might be failure to of a given component to acknowledge Additionally, the results may include measurements, statistics, system information and other quantitative data obtained by the diagnostics.

In Step 506, the results written to the disk image in Step 504 are made available to the user or entity controlling the integrated diagnostic system via the loop driver. In one embodiment of the invention, the loop driver allows the results of the diagnostics to be accessed within the service processor, and are then displayed using the user interface. In one embodiment of the invention, the loop driver mount may then be used to further modify the contents of the disk image, while it is mounted within the host system as a device. In one or more embodiments of the invention, the integrated diagnostic system is configured to identify certain results of diagnostics, and modify the disk image to perform additional related diagnostics. For example, if a general diagnostic measuring the speed of a processor returns a problematic result, the disk image can be amended so that additional diagnostics that observe specific portions of a processor, such as cache latency, page faults, threading, pipelining or other metrics that affect the speed of a processor.

In Step 508, if one of the results received is an error with ramifications for the health and functionality of the host system is received, the integrated diagnostic system is configured to notify the host system. The host system may be notified via the service processor-southbridge connection, via a mutual network connection, or by some other means by which the host system and service processor can communicate. In one embodiment of the invention, the host system is made aware of all of the results of the diagnostics, regardless of the type of result. In one embodiment of the invention, the integrated diagnostic system may include functionality to automatically notify third parties, such as administrators or manufacturers of certain results of diagnostics. For example, if an integrated diagnostic system in a server room reports an extremely high temperature, it may notify the host system so that it can shut down immediately, and notify the administrator that a potentially destructive condition exists.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for performing a set of diagnostics on a host system using a service processor, comprising:
    recognizing a power-on event;
    in response to the power-on event, checking a diagnostic flag, wherein the diagnostic flag indicates the set of diagnostics to be performed;
    retrieving, from internal storage of the service processor, a disk image comprising the set of diagnostics to be performed;
    mounting, using a disk image reader, the disk image within the service processor to obtain a mounted disk image;
    making the disk image accessible to the service processor as a file system by mounting the disk image using a loop driver;
    making the mounted disk image accessible to the host system as a device using a virtual device driver;
    mounting, using a connection between the service processor and the host system, the device within the host system;
    performing, after the mounting of the device, the set of diagnostics on the host system to generate a set of results; and
    writing, using the virtual device driver, the set of results to the mounted disk image.

2. The method of claim 1, further comprising:
    selecting the set of diagnostics to perform; and
    modifying, by the loop driver, the mounted disk image to comprise the set of diagnostics,
    wherein the disk image is simultaneously mounted by the loop driver and the virtual device driver.

3. The method of claim 2, wherein the loop driver sees any modifications made to the disk image by the virtual device driver and the virtual device driver sees any modifications made to the disk image by the loop driver.

4. The method of claim 2, further comprising:
    making accessible, by the loop driver, the set of results.

5. The method of claim 2, wherein the mounted disk image is modified to comprise diagnostic scripts, wherein the diagnostic scripts specify the set of diagnostics on the mounted disk image to be performed.

6. The method of claim 4, wherein the mounted disk image is modified to comprise an alternate set of diagnostics while the set of diagnostics is being performed.

7. The method of claim 4, wherein a user controls the set of diagnostics being performed, by modifying the mounted disk image while the set of diagnostics is being performed.

8. The method of claim 6, wherein the user controls the set of diagnostics being performed using a web-based user interface.

9. An integrated diagnostic system, comprising:
    a host system, comprising a processor and a southbridge connected to the processor, wherein the southbridge is configured to communicate with peripheral devices;
    a service processor, configured to communicate with the host system using the south bridge, and comprising an internal storage, a virtual device driver and a loop driver;
    the internal storage, configured to store a disk image and a diagnostic flag,
    wherein the diagnostic flat indicates a set of diagnostics to be performed, and
        wherein the disk image comprises the set of diagnostics to be run on the host system;
    a disk image reader, configured to mount the disk image within the service processor to obtain a mounted disk image;
    a loop driver configured to make the disk image accessible to the service processor as a file system;
    a virtual device driver, configured to:
        make the disk image appear to the host system as a device;
        perform the set of diagnostics to generate a set of results; and
        write the set of results to the mounted disk image; and
    a user interface, configured to allow a user to interact with the system.

10. The integrated diagnostic system of claim 9, wherein the service processor is configured to communicate with the southbridge of the host system as a Universal Serial Bus (USB) device.

11. The integrated diagnostic system of claim 9, wherein the disk image is simultaneously mounted by the loop driver and virtual device driver.

12. The integrated diagnostic system of claim 11, wherein the virtual device driver is configured to:
  make accessible, by the loop driver, the set of results on the mounted disk image.

13. The integrated diagnostic system of claim 9, wherein the service processor is configured to access and control the host system while the host system is powered off.

14. The integrated diagnostic system of claim 9, wherein the virtual device driver comprises:
  a client, located in the service processor, configured to access the mounted disk image; and
  a server, configured to read and write the mounted disk image through the client, and present the mounted disk image to the host system as the device.

15. A non-transitory computer readable medium comprising a plurality of instructions for performing a set of diagnostics, the plurality of instructions configured to:
  recognize a power-on event;
  check a diagnostic flag, wherein the diagnostic flag indicates the set of diagnostics to be performed;
  retrieve, from internal storage of a service processor, a disk image comprising the set of diagnostics to be performed;
  mount, using a disk image reader, the disk image within the service processor to obtain a mounted disk image;
  make the disk image accessible to the service processor as a file system by mounting the disk image using a loop driver;
  make the mounted disk image accessible to a host system as a device using a virtual device driver;
  mount, using a connection between the service processor and the host system, the device within the host system;
  perform, after the mounting of the device, the set of diagnostics on the host system to generate a set of results; and
  write, using the virtual device driver, the set of results to the mounted disk image.

16. The non-transitory computer readable medium of claim 15, further comprising the plurality of instructions to:
  select the set of diagnostics to perform; and
  modify, by the loop driver, the mounted disk image to comprise the set of diagnostics,
  wherein the disk image is simultaneously mounted by the loop driver and the virtual device driver.

17. The non-transitory computer readable medium of claim 16, wherein the loop driver sees any modifications made to the disk image by the virtual device driver and the virtual device driver sees any modifications made to the disk image by the loop driver.

18. The non-transitory computer readable medium of claim 16, further comprising the plurality of instructions to:
  make accessible, by the loop driver, the set of results.

\* \* \* \* \*

UNITED STATES PATENT AND TRADEMARK OFFICE
CERTIFICATE OF CORRECTION

PATENT NO. : 9,087,040 B2
APPLICATION NO. : 13/721749
DATED : July 21, 2015
INVENTOR(S) : Tobin et al.

Page 1 of 1

It is certified that error appears in the above-identified patent and that said Letters Patent is hereby corrected as shown below:

In the specification

In column 2, line 47, after "and" delete "an".

In column 6, line 24, delete "filesystem" and insert -- file system --, therefor.

In column 8, line 8, delete "processor" and insert -- processor. --, therefor.

In column 9, line 9, after "taking" delete "to" and insert -- too --, therefor.

In column 9, line 11, delete "acknowledge" and insert -- acknowledge. --, therefor.

Signed and Sealed this
First Day of March, 2016

Michelle K. Lee
*Director of the United States Patent and Trademark Office*